United States Patent
Abdella et al.

(10) Patent No.: US 12,384,094 B2
(45) Date of Patent: Aug. 12, 2025

(54) METHOD FOR PRODUCING A VEHICLE INTERIOR COMPONENT

(71) Applicant: LEAR CORPORATION, Southfield, MI (US)

(72) Inventors: David Abdella, Royal Oak, MI (US); Joshua Hallock, Warren, MI (US); Samuel Blair, Troy, MI (US)

(73) Assignee: Lear Corporation, Southfield, MI (US)

( * ) Notice: Subject to any disclaimer, the term of this patent is extended or adjusted under 35 U.S.C. 154(b) by 66 days.

(21) Appl. No.: 17/688,977

(22) Filed: Mar. 8, 2022

(65) Prior Publication Data

US 2023/0286206 A1    Sep. 14, 2023

(51) Int. Cl.
| | | |
|---|---|---|
| *B29C 51/42* | (2006.01) | |
| *B29C 51/26* | (2006.01) | |
| *B29K 105/20* | (2006.01) | |
| *B29L 31/30* | (2006.01) | |

(52) U.S. Cl.
CPC .......... *B29C 51/424* (2013.01); *B29C 51/266* (2013.01); *B29K 2105/206* (2013.01); *B29L 2031/3005* (2013.01)

(58) Field of Classification Search
CPC ..... B29C 51/424; B29C 51/266; B29C 43/02; B29K 2105/206; B29L 2031/3005
See application file for complete search history.

(56) References Cited

U.S. PATENT DOCUMENTS

| | | |
|---|---|---|
| 1,621,008 A | 3/1927 | Fricker |
| 2,130,935 A | 9/1938 | Thompson |
| 2,188,995 A | 2/1940 | Avery et al. |
| 2,630,938 A | 3/1953 | Burnett |
| 2,630,968 A | 3/1953 | Morris |
| 3,155,363 A | 11/1964 | Lohr |
| 3,309,052 A | 3/1967 | Bernard |

(Continued)

FOREIGN PATENT DOCUMENTS

| | | |
|---|---|---|
| AU | 2006227668 A1 | 9/2006 |
| AU | 2003296088 B2 | 9/2008 |

(Continued)

OTHER PUBLICATIONS

International Search Report and Written Opinion of the International Searching Authority for related international application No. PCT/US2023/014571, mailed Jun. 15, 2023, 8 pages.

(Continued)

*Primary Examiner* — Alison L Hindenlang
*Assistant Examiner* — Shibin Liang
(74) *Attorney, Agent, or Firm* — Brooks Kushman PC

(57) ABSTRACT

A method for producing a vehicle interior component includes placing a polymeric cushion blank in a mold having a plurality of apertures and a mold cavity. The method may include the step of passing a first fluid having a first predetermined temperature through at least some of the apertures and through the cushion blank to heat the cushion blank to a compliant, non-liquid state. The method may also include passing a second fluid having a second predetermined temperature lower than the first predetermined temperature through the mold and through the cushion blank to cool cushion blank to a non-compliant state.

20 Claims, 5 Drawing Sheets

(56) References Cited

U.S. PATENT DOCUMENTS

| | | | |
|---|---|---|---|
| 3,315,283 A | 4/1967 | Larsen |
| 3,630,572 A | 12/1971 | Homier |
| 3,689,620 A | 9/1972 | Miyazaki et al. |
| 3,733,658 A | 5/1973 | Mitchell |
| 3,794,378 A | 2/1974 | Haslam et al. |
| D239,147 S | 3/1976 | Karlsen |
| 3,961,823 A | 6/1976 | Caudill, Jr. |
| 4,031,579 A | 6/1977 | Larned |
| 4,287,657 A | 9/1981 | Andre et al. |
| 4,396,823 A | 8/1983 | Nihei et al. |
| 4,476,594 A | 10/1984 | McLeod |
| 4,563,387 A | 1/1986 | Takagi et al. |
| 4,663,211 A | 5/1987 | Kon |
| 4,751,029 A | 6/1988 | Swanson |
| 4,859,516 A | 8/1989 | Yamanaka et al. |
| 4,860,402 A | 8/1989 | Dichtel |
| 4,876,135 A | 10/1989 | McIntosh |
| 4,881,997 A | 11/1989 | Hatch |
| 4,900,377 A | 2/1990 | Redford et al. |
| 4,913,757 A | 4/1990 | Yamanaka et al. |
| 4,933,224 A | 6/1990 | Hatch |
| 4,952,265 A | 8/1990 | Yamanaka et al. |
| 4,953,770 A | 9/1990 | Bond, Sr. |
| 5,003,664 A | 4/1991 | Wong |
| 5,007,676 A | 4/1991 | Lien |
| 5,016,941 A | 5/1991 | Yokota |
| 5,092,381 A | 3/1992 | Feijin et al. |
| 5,095,592 A | 3/1992 | Doerfling |
| 5,313,034 A | 5/1994 | Grimm et al. |
| 5,378,296 A | 1/1995 | Vesa |
| 5,381,922 A | 1/1995 | Gladman |
| 5,405,178 A | 4/1995 | Weingartner et al. |
| D364,269 S | 11/1995 | Sabosky |
| 5,464,491 A | 11/1995 | Yamanaka |
| 5,482,665 A * | 1/1996 | Gill .................. D04H 1/558 264/122 |
| 5,492,662 A | 2/1996 | Kargol et al. |
| 5,494,627 A | 2/1996 | Kargol et al. |
| 5,536,341 A | 7/1996 | Kelman |
| 5,551,755 A | 9/1996 | Lindberg |
| 5,569,641 A | 10/1996 | Smith |
| 5,586,807 A | 12/1996 | Taggart |
| 5,587,121 A | 12/1996 | Vesa |
| 5,620,759 A | 4/1997 | Insley et al. |
| 5,622,262 A | 4/1997 | Sadow |
| 5,639,543 A | 6/1997 | Isoda et al. |
| 5,669,129 A | 9/1997 | Smith et al. |
| 5,669,799 A | 9/1997 | Moseneder et al. |
| 5,679,296 A | 10/1997 | Kelman et al. |
| 5,733,825 A | 3/1998 | Martin et al. |
| 5,788,332 A | 8/1998 | Hettinga |
| 5,811,186 A | 9/1998 | Martin et al. |
| 5,819,408 A | 10/1998 | Catlin |
| 5,833,321 A | 11/1998 | Kim et al. |
| 5,966,783 A | 10/1999 | Genereux et al. |
| 6,057,024 A | 5/2000 | Mleziva et al. |
| 6,063,317 A | 5/2000 | Carroll, III |
| 6,131,220 A | 10/2000 | Morimura |
| 6,272,707 B1 | 8/2001 | Robrecht et al. |
| 6,283,552 B1 | 9/2001 | Halse et al. |
| 6,302,487 B1 | 10/2001 | Fujita et al. |
| 6,347,790 B1 | 2/2002 | Nishibori et al. |
| 6,378,150 B1 | 4/2002 | Minegishi et al. |
| D461,746 S | 8/2002 | Olson et al. |
| 6,457,218 B1 | 10/2002 | Lawrence |
| 6,558,590 B1 | 5/2003 | Stewart |
| 6,668,429 B2 | 12/2003 | Fujisawa et al. |
| 6,766,201 B2 | 7/2004 | Von Arx et al. |
| 6,776,201 B2 | 8/2004 | Willis |
| 6,918,146 B2 | 7/2005 | England |
| D523,330 S | 6/2006 | Mattesky |
| 7,073,230 B2 | 7/2006 | Boville |
| 7,100,978 B2 | 9/2006 | Ekern et al. |
| D530,192 S | 10/2006 | Becerra |
| 7,128,371 B2 | 10/2006 | Kawasaki et al. |
| 7,141,768 B2 | 11/2006 | Malofsky et al. |
| 7,158,968 B2 | 1/2007 | Cardno et al. |
| D538,704 S | 3/2007 | Kaminski |
| 7,290,300 B1 | 11/2007 | Khambete |
| 7,377,762 B2 | 5/2008 | Nishibori et al. |
| 7,427,103 B2 | 9/2008 | Weber |
| 7,481,489 B2 | 1/2009 | Demick |
| 7,506,939 B2 | 3/2009 | Borckschneider et al. |
| 7,547,061 B2 | 6/2009 | Horimatsu et al. |
| 7,549,707 B2 | 6/2009 | Brennan et al. |
| 7,622,179 B2 | 11/2009 | Patel |
| 7,625,629 B2 | 12/2009 | Takaoka |
| 7,669,925 B2 | 3/2010 | Beck et al. |
| 7,707,743 B2 | 5/2010 | Schindler et al. |
| 7,771,375 B2 | 8/2010 | Nishibori et al. |
| 7,837,263 B2 | 11/2010 | Booth et al. |
| 7,892,991 B2 | 2/2011 | Yamanaka et al. |
| D636,293 S | 4/2011 | Dolce et al. |
| 7,926,204 B2 * | 4/2011 | Ungari ................. B29D 35/122 36/25 R |
| 7,946,649 B2 | 5/2011 | Galbreath et al. |
| 7,993,734 B2 | 8/2011 | Takaoka |
| 8,052,212 B2 | 11/2011 | Backendorf |
| 8,056,263 B2 | 11/2011 | Schindler et al. |
| 8,226,882 B2 | 7/2012 | Takaoka |
| 8,240,759 B2 | 8/2012 | Hobl et al. |
| 8,276,235 B2 | 10/2012 | Naughton |
| 8,277,210 B2 | 10/2012 | Takaoka |
| D677,193 S | 3/2013 | MacDonald |
| 8,563,121 B2 | 10/2013 | Takaoka |
| 8,563,123 B2 | 10/2013 | Takaoka |
| 8,568,635 B2 | 10/2013 | Takaoka |
| 8,721,825 B2 | 5/2014 | Takaoka |
| 8,752,902 B2 | 6/2014 | Labish |
| 8,757,996 B2 | 6/2014 | Takaoka |
| 8,828,293 B2 | 9/2014 | Takaoka |
| 8,882,202 B2 | 11/2014 | Petzel et al. |
| 8,932,692 B2 | 1/2015 | Pearce |
| 9,004,591 B2 | 4/2015 | Murasaki et al. |
| 9,097,921 B2 | 8/2015 | Ogasawara et al. |
| 9,168,854 B2 | 10/2015 | Ursino et al. |
| 9,169,585 B2 | 10/2015 | Takaoka |
| 9,174,404 B2 | 11/2015 | Takaoka |
| 9,179,748 B2 | 11/2015 | Esti |
| 9,194,066 B2 | 11/2015 | Takaoka |
| 9,283,875 B1 | 3/2016 | Pellettiere |
| 9,334,593 B2 | 5/2016 | Sasaki |
| 9,434,286 B2 | 9/2016 | Klusmeier et al. |
| 9,440,390 B2 | 9/2016 | Takaoka |
| 9,447,522 B2 | 9/2016 | Zikeli et al. |
| 9,456,702 B2 | 10/2016 | Miyata et al. |
| 9,528,209 B2 | 12/2016 | Takaoka |
| 9,561,612 B2 | 2/2017 | Takaoka |
| 9,598,803 B2 | 3/2017 | Takaoka |
| 9,615,670 B2 | 4/2017 | Takaoka |
| 9,616,790 B2 | 4/2017 | Stankiewicz et al. |
| 9,617,021 B2 | 4/2017 | McCorkle et al. |
| 9,669,744 B2 | 6/2017 | Cao et al. |
| 9,688,007 B2 | 6/2017 | Cheng |
| 9,708,067 B2 | 7/2017 | Wilson et al. |
| 9,751,442 B2 | 9/2017 | Smith |
| 9,771,174 B2 | 9/2017 | Murray |
| D798,875 S | 10/2017 | Huang |
| 9,789,796 B1 | 10/2017 | White |
| 9,809,137 B2 | 11/2017 | Kheil |
| 9,918,559 B2 | 3/2018 | Osaki |
| 9,918,560 B2 | 3/2018 | Osaki |
| 9,925,899 B2 | 3/2018 | Mogi et al. |
| 9,938,649 B2 | 4/2018 | Taninaka et al. |
| 9,970,140 B2 | 5/2018 | Taninaka et al. |
| 10,118,323 B2 | 11/2018 | Fujita et al. |
| 10,150,320 B2 | 12/2018 | Ellringmann et al. |
| 10,231,511 B2 | 3/2019 | Guyan et al. |
| 10,233,073 B2 | 3/2019 | Takaoka |
| 10,266,977 B2 | 4/2019 | Takaoka |
| 10,316,444 B2 | 6/2019 | Wakui et al. |
| 10,328,618 B2 | 6/2019 | Takaoka |
| 10,343,565 B2 | 7/2019 | Baek et al. |
| 10,398,236 B2 | 9/2019 | Achten et al. |

(56) References Cited

U.S. PATENT DOCUMENTS

| | | |
|---|---|---|
| 10,399,848 B2 | 9/2019 | Kristo et al. |
| 10,414,305 B2 | 9/2019 | Ishii et al. |
| 10,421,414 B2 | 9/2019 | Townley et al. |
| 10,501,598 B2 | 12/2019 | Baldwin et al. |
| 10,604,040 B2 | 3/2020 | Clauser et al. |
| 10,618,799 B2 | 4/2020 | Shah et al. |
| 10,730,419 B2 | 8/2020 | Low et al. |
| 10,736,435 B2 | 8/2020 | Duncan et al. |
| 10,744,914 B2 | 8/2020 | Baek et al. |
| 10,750,820 B2 | 8/2020 | Guyan |
| RE48,225 E | 9/2020 | Kheil et al. |
| 10,780,805 B2 | 9/2020 | Kamata |
| 10,806,272 B2 | 10/2020 | Ando et al. |
| 10,821,862 B2 | 11/2020 | Russman et al. |
| 10,843,600 B2 | 11/2020 | Booth et al. |
| 10,882,444 B2 | 1/2021 | Townley et al. |
| 10,889,071 B2 | 1/2021 | Kojima et al. |
| D909,792 S | 2/2021 | Pound |
| 10,934,644 B2 | 3/2021 | Taninaka et al. |
| 11,007,761 B2 | 5/2021 | Ben-Daat et al. |
| 11,168,421 B2 | 11/2021 | Wakui et al. |
| 11,186,336 B2 | 11/2021 | Primeaux et al. |
| D948,764 S | 4/2022 | Peterson |
| 11,369,532 B2 | 6/2022 | Wilson et al. |
| 11,383,625 B2 | 7/2022 | Voigt et al. |
| 11,554,699 B2 | 1/2023 | Liau et al. |
| D1,005,380 S | 11/2023 | McWilliams et al. |
| 2002/0101109 A1 | 8/2002 | Stiller et al. |
| 2002/0193221 A1 | 12/2002 | Tisi |
| 2003/0026970 A1 | 2/2003 | Hernandez et al. |
| 2003/0032731 A1 | 2/2003 | Oswald et al. |
| 2003/0061663 A1 | 4/2003 | Lampel |
| 2003/0092335 A1 | 5/2003 | Takaoko |
| 2004/0036326 A1 | 2/2004 | Bajic et al. |
| 2004/0099981 A1 | 5/2004 | Gerking |
| 2004/0126577 A1 | 7/2004 | Lee et al. |
| 2004/0142619 A1 | 7/2004 | Ueno et al. |
| 2004/0255385 A1 | 12/2004 | England |
| 2005/0030011 A1 | 2/2005 | Shimizu et al. |
| 2005/0066423 A1 | 3/2005 | Hogan |
| 2005/0198874 A1 | 9/2005 | Wurm |
| 2005/0238842 A1 | 10/2005 | Schindzielorz et al. |
| 2006/0068120 A1 | 3/2006 | Sreenivasan et al. |
| 2006/0075615 A1 | 4/2006 | Khambete |
| 2006/0116045 A1 | 6/2006 | Nishibori et al. |
| 2006/0198983 A1 | 9/2006 | Patel |
| 2006/0237986 A1 | 10/2006 | Brockschneider et al. |
| 2007/0001336 A1* | 1/2007 | Nishibori ........... D04H 3/037 264/103 |
| 2007/0057414 A1 | 3/2007 | Hartge |
| 2007/0066197 A1 | 3/2007 | Woo et al. |
| 2007/0134464 A1 | 6/2007 | Schindzielorz et al. |
| 2007/0207691 A1 | 9/2007 | Cobbett Wiles et al. |
| 2008/0099458 A1 | 5/2008 | Hilmer |
| 2008/0102149 A1 | 5/2008 | Williams |
| 2008/0203615 A1 | 8/2008 | Brum |
| 2008/0252111 A1 | 10/2008 | Rothkop et al. |
| 2008/0254281 A1 | 10/2008 | Chen et al. |
| 2008/0309143 A1 | 12/2008 | Booth et al. |
| 2009/0008377 A1 | 1/2009 | Nathan et al. |
| 2009/0108494 A1 | 4/2009 | Ito et al. |
| 2009/0152909 A1 | 6/2009 | Andersson |
| 2009/0269570 A1 | 10/2009 | Takaoka |
| 2009/0269571 A1 | 10/2009 | Takaoka |
| 2010/0181796 A1 | 7/2010 | Galbreath et al. |
| 2010/0258334 A1 | 10/2010 | Akaike et al. |
| 2011/0252568 A1 | 10/2011 | Ramp |
| 2011/0278902 A1 | 11/2011 | Galbreath et al. |
| 2011/0316185 A1 | 12/2011 | Takaoka |
| 2012/0042452 A1 | 2/2012 | Takaoka |
| 2012/0104646 A1 | 5/2012 | Takaoka |
| 2012/0112515 A1 | 5/2012 | Labish |
| 2012/0174352 A1 | 7/2012 | Tsunoda |
| 2012/0180939 A1 | 7/2012 | Takaoka |
| 2012/0181841 A1 | 7/2012 | Petzel et al. |
| 2012/0301701 A1 | 11/2012 | Takaoka |
| 2012/0319323 A1 | 12/2012 | Takaoka |
| 2012/0328722 A1 | 12/2012 | Takaoka |
| 2013/0000043 A1 | 1/2013 | Bullard et al. |
| 2013/0020016 A1 | 1/2013 | Takaoka |
| 2013/0137330 A1 | 5/2013 | Grimm |
| 2013/0161858 A1 | 6/2013 | Sasaki |
| 2013/0164123 A1 | 6/2013 | Helmenstein |
| 2013/0189472 A1 | 7/2013 | Takaoka |
| 2013/0200661 A1 | 8/2013 | Klusmeier et al. |
| 2014/0029900 A1 | 1/2014 | Logan, Jr. et al. |
| 2014/0035191 A1 | 2/2014 | Takaoka |
| 2014/0037907 A1 | 2/2014 | Takaoka |
| 2014/0037908 A1 | 2/2014 | Takaoka |
| 2014/0042792 A1 | 2/2014 | Kajiwara et al. |
| 2014/0062161 A1 | 3/2014 | Elenbaas et al. |
| 2014/0138016 A1 | 5/2014 | Takaoka |
| 2014/0167328 A1 | 6/2014 | Petzel |
| 2014/0354029 A1 | 12/2014 | Takaoka |
| 2014/0370769 A1 | 12/2014 | Osaki |
| 2014/0378015 A1 | 12/2014 | Osaki |
| 2015/0072107 A1 | 3/2015 | Fujita et al. |
| 2015/0091209 A1 | 4/2015 | Mueller et al. |
| 2015/0197056 A1 | 7/2015 | Takaoka |
| 2015/0210192 A1 | 7/2015 | Benson et al. |
| 2015/0219136 A1 | 8/2015 | Koelling |
| 2015/0266263 A1 | 9/2015 | Ichikawa |
| 2015/0272332 A1 | 10/2015 | Noguchi et al. |
| 2015/0274048 A1 | 10/2015 | Mogi et al. |
| 2015/0284894 A1 | 10/2015 | Takaoka |
| 2015/0367583 A1 | 12/2015 | Blot et al. |
| 2016/0009209 A1 | 1/2016 | Cao et al. |
| 2016/0010250 A1 | 1/2016 | Taninaka et al. |
| 2016/0023387 A1 | 1/2016 | Takaoka |
| 2016/0032506 A1 | 2/2016 | Takaoka |
| 2016/0051009 A1 | 2/2016 | Kormann et al. |
| 2016/0052433 A1 | 2/2016 | Ono et al. |
| 2016/0052435 A1 | 2/2016 | Nakada |
| 2016/0096462 A1 | 4/2016 | Kromm et al. |
| 2016/0122925 A1 | 5/2016 | Shah et al. |
| 2016/0144756 A1 | 5/2016 | Ito et al. |
| 2016/0157628 A1 | 6/2016 | Khambete et al. |
| 2016/0174725 A1 | 6/2016 | Takaoka |
| 2016/0263802 A1 | 9/2016 | Takaoka |
| 2016/0318428 A1 | 11/2016 | Hugues |
| 2016/0374428 A1 | 12/2016 | Kormann et al. |
| 2017/0043695 A1 | 2/2017 | Kitamoto et al. |
| 2017/0174346 A1 | 6/2017 | Wilson et al. |
| 2017/0181505 A1 | 6/2017 | Burke et al. |
| 2017/0184108 A1 | 6/2017 | Scancarello et al. |
| 2017/0332733 A1 | 11/2017 | Cluckers et al. |
| 2018/0054858 A1 | 2/2018 | Dry |
| 2018/0070736 A1 | 3/2018 | Achten et al. |
| 2018/0086623 A1 | 3/2018 | Takaoka |
| 2018/0147792 A1 | 5/2018 | Kojima et al. |
| 2018/0148312 A1 | 5/2018 | Kojima et al. |
| 2018/0229634 A1 | 8/2018 | Baisch et al. |
| 2018/0332663 A1 | 11/2018 | Lisseman et al. |
| 2019/0002272 A1 | 1/2019 | Kristo et al. |
| 2019/0090656 A1 | 3/2019 | Duncan et al. |
| 2019/0125092 A1 | 5/2019 | Ando et al. |
| 2019/0135199 A1 | 5/2019 | Galan Garcia et al. |
| 2019/0161593 A1 | 5/2019 | Hattori |
| 2019/0232835 A1 | 8/2019 | Murakami |
| 2019/0298072 A1 | 10/2019 | Bhatia et al. |
| 2019/0344691 A1 | 11/2019 | Liau et al. |
| 2019/0351787 A1 | 11/2019 | Lodhia et al. |
| 2019/0357695 A1 | 11/2019 | Achten et al. |
| 2019/0381955 A1 | 12/2019 | Mueller et al. |
| 2019/0390382 A1 | 12/2019 | Rong et al. |
| 2020/0017006 A1 | 1/2020 | Booth et al. |
| 2020/0039399 A1 | 2/2020 | Oomen et al. |
| 2020/0165122 A1 | 5/2020 | Salzmann |
| 2020/0180479 A1 | 6/2020 | Russman et al. |
| 2020/0231428 A1 | 7/2020 | Migneco et al. |
| 2020/0262323 A1 | 8/2020 | Robinson et al. |
| 2020/0315365 A1 | 10/2020 | Kondo et al. |
| 2020/0332445 A1 | 10/2020 | Taninaka et al. |
| 2020/0360210 A1 | 11/2020 | Zoni, III et al. |

(56) References Cited

U.S. PATENT DOCUMENTS

| | | | |
|---|---|---|---|
| 2021/0024155 | A1 | 1/2021 | Primeaux et al. |
| 2021/0046731 | A1 | 2/2021 | Nishikawa et al. |
| 2021/0054549 | A1 | 2/2021 | Takaoka |
| 2021/0074258 | A1 | 3/2021 | Konno et al. |
| 2021/0086670 | A1 | 3/2021 | Kozlowski et al. |
| 2021/0115607 | A1 | 4/2021 | Inoue et al. |
| 2021/0188138 | A1 | 6/2021 | Powell et al. |
| 2021/0221266 | A1 | 7/2021 | Kozlowski et al. |
| 2021/0291421 | A1 | 9/2021 | Nattrass et al. |
| 2021/0299995 | A1 | 9/2021 | Sieradzki et al. |
| 2022/0017003 | A1 | 1/2022 | Carraro et al. |
| 2022/0017718 | A1 | 1/2022 | Martin et al. |
| 2022/0025561 | A1 | 1/2022 | Yasui et al. |
| 2022/0169554 | A1 | 6/2022 | Du Moulinet et al. |
| 2022/0178057 | A1 | 6/2022 | Maschino et al. |
| 2022/0314851 | A1 | 10/2022 | Pereny et al. |
| 2022/0314854 | A1 | 10/2022 | Pereny et al. |
| 2022/0370749 | A1 | 11/2022 | Dunn et al. |
| 2022/0402416 | A1 | 12/2022 | Yang et al. |
| 2022/0410775 | A1 | 12/2022 | Aoki et al. |
| 2023/0028451 | A1 | 1/2023 | Gastaldi |
| 2023/0173964 | A1 | 6/2023 | Webster et al. |
| 2023/0191678 | A1 | 6/2023 | Blair et al. |
| 2023/0191680 | A1 | 6/2023 | Blair et al. |
| 2023/0322136 | A1 | 10/2023 | Wang et al. |

FOREIGN PATENT DOCUMENTS

| | | | |
|---|---|---|---|
| BR | 112014004632 B1 | 4/2021 | |
| BR | 112014001603 A2 | 8/2021 | |
| BR | 112013020474 B1 | 9/2021 | |
| BR | 112017016357 B1 | 3/2022 | |
| CA | 3102262 A1 | 12/2019 | |
| CN | 100467696 C | 3/2009 | |
| CN | 1859862 B | 4/2010 | |
| CN | 202509164 U | 10/2012 | |
| CN | 105026632 A | 11/2015 | |
| CN | 102959151 B | 4/2016 | |
| CN | 105612279 A | 5/2016 | |
| CN | 103328711 B | 6/2016 | |
| CN | 104024511 B | 8/2016 | |
| CN | 104582538 B | 9/2016 | |
| CN | 104080959 B | 2/2017 | |
| CN | 106387295 A | 2/2017 | |
| CN | 103998668 B | 3/2017 | |
| CN | 103827376 B | 6/2017 | |
| CN | 105683434 B | 7/2017 | |
| CN | 104285003 B | 9/2017 | |
| CN | 105705695 B | 1/2018 | |
| CN | 207140883 U | 3/2018 | |
| CN | 208484779 U | 2/2019 | |
| CN | 109552123 A | 4/2019 | |
| CN | 109680413 A | 4/2019 | |
| CN | 110316033 A | 10/2019 | |
| CN | 107614238 B | 2/2020 | |
| CN | 107208339 B | 6/2020 | |
| CN | 107532357 B | 8/2020 | |
| CN | 106231959 B | 10/2020 | |
| CN | 111989430 A | 11/2020 | |
| CN | 112020578 A | 12/2020 | |
| CN | 107708493 B | 1/2021 | |
| CN | 107208340 B | 2/2021 | |
| CN | 109552123 B | 7/2021 | |
| CN | 113166995 A | 7/2021 | |
| CN | 213618701 U | 7/2021 | |
| CN | 215203369 U | 12/2021 | |
| CN | 113930900 A | 1/2022 | |
| CN | 109680412 B | 2/2022 | |
| CN | 115139881 A | 10/2022 | |
| DE | 2626748 A1 | 12/1977 | |
| DE | 2626748 C3 | 10/1979 | |
| DE | 3127303 A1 | 1/1983 | |
| DE | 3037834 C2 | 5/1987 | |
| DE | 3690196 C1 | 10/1989 | |
| DE | 29822649 U1 | 4/1999 | |
| DE | 20100848 U1 | 3/2001 | |
| DE | 102004053133 A1 | 5/2006 | |
| DE | 202006017670 U1 | 7/2007 | |
| DE | 102006020306 A1 | 11/2007 | |
| DE | 102008033468 A1 | 2/2009 | |
| DE | 112013005643 T5 | 8/2015 | |
| DE | 202018104691 U1 | 11/2019 | |
| DE | 112019002208 T5 | 1/2021 | |
| DE | 102020210092 A1 | 3/2021 | |
| DE | 102022107559 A1 | 10/2022 | |
| DK | 1832675 T3 | 6/2013 | |
| DK | 2772576 T3 | 5/2015 | |
| DK | 3255192 T3 | 3/2020 | |
| DK | 202370025 A1 | 2/2024 | |
| DK | 202370426 A1 | 8/2024 | |
| EP | 0240388 A2 | 10/1987 | |
| EP | 0145603 B1 | 4/1988 | |
| EP | 0370991 A2 | 5/1990 | |
| EP | 0392568 A1 | 10/1990 | |
| EP | 0805064 A2 | 11/1997 | |
| EP | 0890430 A2 | 1/1999 | |
| EP | 0894885 * | 2/1999 | ............... D04H 1/00 |
| EP | 0926302 A2 | 6/1999 | |
| EP | 0894885 B1 | 11/2002 | |
| EP | 1586687 A1 | 10/2005 | |
| EP | 2335962 A1 | 4/2010 | |
| EP | 1270787 B1 | 6/2010 | |
| EP | 1858944 B1 | 7/2011 | |
| EP | 2532502 A1 | 12/2012 | |
| EP | 2565304 A1 | 3/2013 | |
| EP | 1832675 B1 | 4/2013 | |
| EP | 1683446 B1 | 7/2013 | |
| EP | 2774807 A2 | 9/2014 | |
| EP | 2489770 B1 | 1/2015 | |
| EP | 2772576 B1 | 4/2015 | |
| EP | 2230132 B1 | 5/2016 | |
| EP | 2653598 B1 | 7/2016 | |
| EP | 3210487 A1 | 8/2017 | |
| EP | 2792776 B1 | 10/2017 | |
| EP | 2792775 B1 | 11/2017 | |
| EP | 2848721 B1 | 1/2018 | |
| EP | 3305500 A1 | 4/2018 | |
| EP | 2751312 B1 | 7/2018 | |
| EP | 3064627 B1 | 8/2018 | |
| EP | 3064628 B1 | 8/2018 | |
| EP | 2894246 B1 | 10/2018 | |
| EP | 2966206 B1 | 11/2018 | |
| EP | 3256632 B1 | 3/2019 | |
| EP | 3255192 B1 | 1/2020 | |
| EP | 3779017 A1 | 2/2021 | |
| EP | 3826820 A1 | 6/2021 | |
| EP | 3889332 A1 | 10/2021 | |
| EP | 3610760 B1 | 11/2021 | |
| EP | 3974572 A1 | 3/2022 | |
| ES | 2335962 B1 | 4/2010 | |
| ES | 2346180 T3 | 10/2010 | |
| FR | 2432108 A1 | 2/1980 | |
| FR | 2596626 A1 | 10/1987 | |
| FR | 2675440 B1 | 12/1993 | |
| FR | 2850260 A1 | 7/2004 | |
| FR | 3050409 B1 | 10/2017 | |
| FR | 3063461 B1 | 3/2019 | |
| FR | 3109753 B1 | 11/2021 | |
| GB | 721866 A | 1/1955 | |
| GB | 1009799 A | 11/1965 | |
| GB | 2275695 A | 9/1994 | |
| GB | 2576141 A | 2/2020 | |
| GB | 2577591 B | 4/2021 | |
| GB | 2589497 B | 11/2021 | |
| GB | 2628886 A | 10/2024 | |
| IN | 201717042989 A | 3/2018 | |
| IN | 336480 B | 5/2020 | |
| IN | 202047045846 A | 10/2020 | |
| IN | 351780 B | 11/2020 | |
| IN | 382056 B | 11/2021 | |
| IN | 202117027707 A | 11/2021 | |
| JP | S556515 A | 1/1980 | |
| JP | S5517527 A | 2/1980 | |
| JP | H04286627 A | 10/1992 | |

(56) References Cited

FOREIGN PATENT DOCUMENTS

| | | |
|---|---|---|
| JP | H07300760 A | 11/1995 |
| JP | H0861414 A | 3/1996 |
| JP | H1046185 A | 2/1998 |
| JP | H115282 A | 1/1999 |
| JP | H11350326 A | 12/1999 |
| JP | 2000004993 A | 1/2000 |
| JP | 2001046185 A | 2/2001 |
| JP | 2001055719 A | 2/2001 |
| JP | 2001061612 A | 3/2001 |
| JP | 2001070106 A | 3/2001 |
| JP | 2001310378 A | 11/2001 |
| JP | 2001329631 A | 11/2001 |
| JP | 2002084894 A | 3/2002 |
| JP | 2002087879 A | 3/2002 |
| JP | 2002088636 A | 3/2002 |
| JP | 2003250667 A | 9/2003 |
| JP | 2003251089 A | 9/2003 |
| JP | 2003268668 A | 9/2003 |
| JP | 2004202858 A | 7/2004 |
| JP | 3686690 B2 | 8/2005 |
| JP | 3686692 B2 | 8/2005 |
| JP | 2006006924 A | 1/2006 |
| JP | 2006200117 A | 8/2006 |
| JP | 2006200119 A | 8/2006 |
| JP | 2006200120 A | 8/2006 |
| JP | 2007098013 A | 4/2007 |
| JP | 4181878 B2 | 11/2008 |
| JP | 2009090089 A | 4/2009 |
| JP | 4350285 B2 | 10/2009 |
| JP | 4350286 B2 | 10/2009 |
| JP | 4350287 B2 | 10/2009 |
| JP | 2011045424 A | 3/2011 |
| JP | 2011152779 A | 8/2011 |
| JP | 2011177413 A | 9/2011 |
| JP | 4835150 B2 | 12/2011 |
| JP | 4907991 B2 | 4/2012 |
| JP | 2012115515 A | 6/2012 |
| JP | 5165809 B1 | 3/2013 |
| JP | 2013091862 A | 5/2013 |
| JP | 5339107 B1 | 11/2013 |
| JP | 5418741 B1 | 2/2014 |
| JP | 2014038151 A | 2/2014 |
| JP | 5454733 B1 | 3/2014 |
| JP | 5454734 B1 | 3/2014 |
| JP | 2014064767 A | 4/2014 |
| JP | 5532178 B1 | 6/2014 |
| JP | 5532179 B1 | 6/2014 |
| JP | 2014104050 A | 6/2014 |
| JP | 5569641 B1 | 8/2014 |
| JP | 2015205611 A | 11/2015 |
| JP | 5868964 B2 | 2/2016 |
| JP | 2016028900 A | 3/2016 |
| JP | 2016036972 A | 3/2016 |
| JP | 5909581 B1 | 4/2016 |
| JP | 5976511 B2 | 8/2016 |
| JP | 5986584 B2 | 9/2016 |
| JP | 5990194 B2 | 9/2016 |
| JP | 2016189879 A | 11/2016 |
| JP | 6182249 B2 | 8/2017 |
| JP | 2017150100 A | 8/2017 |
| JP | 6228278 B2 | 11/2017 |
| JP | 6294140 B2 | 3/2018 |
| JP | WO2016189879 A1 | 3/2018 |
| JP | 6311918 B2 | 4/2018 |
| JP | 6311919 B2 | 4/2018 |
| JP | 6318643 B2 | 5/2018 |
| JP | 6347492 B2 | 6/2018 |
| JP | 6527602 B2 | 6/2019 |
| JP | 6566900 B2 | 8/2019 |
| JP | 2019173217 A | 10/2019 |
| JP | 2019173218 A | 10/2019 |
| JP | 2019189972 A | 10/2019 |
| JP | 2019210565 A | 12/2019 |
| JP | 6661666 B2 | 3/2020 |
| JP | 2020045589 A | 3/2020 |
| JP | 2020090648 A | 6/2020 |
| JP | 6725823 B2 | 7/2020 |
| JP | 2020127523 A | 8/2020 |
| JP | 2020156629 A | 10/2020 |
| JP | 6786500 B2 | 11/2020 |
| JP | 2020192164 A | 12/2020 |
| JP | 6819297 B2 | 1/2021 |
| JP | 2021045365 A | 3/2021 |
| JP | 6863537 B2 | 4/2021 |
| JP | 6909823 B2 | 7/2021 |
| JP | WO2020090648 A1 | 10/2021 |
| JP | 7002010 B2 | 2/2022 |
| JP | 7158968 B2 | 10/2022 |
| KR | 200207612 Y1 | 1/2001 |
| KR | 101141773 B1 | 5/2012 |
| KR | 101250622 B1 | 4/2013 |
| KR | 20130067823 A | 6/2013 |
| KR | 20170017488 A | 2/2017 |
| KR | 101717488 B1 | 3/2017 |
| KR | 101722929 B1 | 4/2017 |
| KR | 101722932 B1 | 4/2017 |
| KR | 20170107554 A | 9/2017 |
| KR | 20170117085 A | 10/2017 |
| KR | 101829235 B1 | 2/2018 |
| KR | 101928730 B1 | 3/2019 |
| KR | 101961514 B1 | 3/2019 |
| KR | 101983204 B1 | 5/2019 |
| KR | 102002393 B1 | 7/2019 |
| KR | 102083055 B1 | 2/2020 |
| KR | 102137446 B1 | 7/2020 |
| KR | 102148214 B1 | 8/2020 |
| KR | 102227060 B1 | 3/2021 |
| KR | 20210076130 A | 6/2021 |
| NL | 1032699 C2 | 4/2008 |
| WO | 1992018224 A1 | 10/1992 |
| WO | 1995015768 A1 | 6/1995 |
| WO | 1997002377 A1 | 1/1997 |
| WO | 2000047801 A1 | 8/2000 |
| WO | 2000071382 A1 | 11/2000 |
| WO | 01068967 A1 | 9/2001 |
| WO | 2002061217 A1 | 8/2002 |
| WO | 2004014690 A1 | 2/2004 |
| WO | 2004063450 A1 | 7/2004 |
| WO | 2005030011 A1 | 4/2005 |
| WO | 2006068120 A1 | 6/2006 |
| WO | 2009092153 A1 | 7/2009 |
| WO | 2010068854 A1 | 6/2010 |
| WO | 2010090093 A1 | 8/2010 |
| WO | 2011102951 A1 | 8/2011 |
| WO | 2012035736 A1 | 3/2012 |
| WO | 2012157289 A1 | 11/2012 |
| WO | 2013030400 A1 | 3/2013 |
| WO | 2013088736 A1 | 6/2013 |
| WO | 2013088737 A1 | 6/2013 |
| WO | 2013168699 A1 | 11/2013 |
| WO | 2014038151 A1 | 3/2014 |
| WO | 2014080614 A1 | 5/2014 |
| WO | 2014132484 A1 | 9/2014 |
| WO | 2015050134 A1 | 4/2015 |
| WO | 2015064523 A1 | 5/2015 |
| WO | 2015064557 A1 | 5/2015 |
| WO | 2015163188 A1 | 10/2015 |
| WO | 2016125766 A1 | 8/2016 |
| WO | 2016130602 A1 | 8/2016 |
| WO | 2016177425 A1 | 11/2016 |
| WO | 2016189879 A1 | 12/2016 |
| WO | 2017119157 A1 | 7/2017 |
| WO | 2017122370 A1 | 7/2017 |
| WO | 2018068451 A1 | 4/2018 |
| WO | 2017199474 A1 | 2/2019 |
| WO | WO2019036559 A1 | 2/2019 |
| WO | 2019188090 A1 | 10/2019 |
| WO | 2019230304 A1 | 12/2019 |
| WO | 2020021263 A1 | 1/2020 |
| WO | 2020090648 A1 | 5/2020 |
| WO | 2020111110 A1 | 6/2020 |
| WO | 2020116327 A1 | 6/2020 |
| WO | 2020245670 A1 | 12/2020 |
| WO | 2021074601 A1 | 4/2021 |

(56) References Cited

FOREIGN PATENT DOCUMENTS

| WO | 2021122937 A1 | 6/2021 |
|---|---|---|
| WO | 2021141601 A1 | 7/2021 |
| WO | 2020045589 A1 | 8/2021 |
| WO | 2022097435 A1 | 5/2022 |
| WO | 2023101995 A2 | 6/2023 |
| WO | 2023122018 A2 | 6/2023 |
| WO | 2023172483 A1 | 9/2023 |
| WO | 2023204905 A1 | 9/2023 |
| WO | 2023220261 A1 | 11/2023 |
| WO | 2023244721 A1 | 12/2023 |
| WO | 2023250026 A1 | 12/2023 |
| WO | 2024006134 A1 | 1/2024 |
| WO | 2024006143 A1 | 1/2024 |
| WO | 2024097012 A1 | 5/2024 |
| WO | 2024136943 A1 | 6/2024 |

OTHER PUBLICATIONS https://www.toyobo-global.com/seihin/breathair_youto_htm, Toyobo Breathair, Cushion Materials, 1996-2013, 3 pages.
https://www.youtube.com/watch2v=eFiPBu fBe4, The Making of a Newton Wovenaire Crib Mattress, Apr. 21, 2016, 3 pages.
http://airstring.com, Introducing Airstring The Future of Cushioning, 2016, 13 pages.
Airstring.com, About Airstring, Jan. 18, 2021, 13 pages.
Www.newtonbaby.com/pages/design, Born in water, designed to breathe, Jan. 28, 2021, 11 pages.
https://www.toyobo-global.com/seihin/breathair/breathair_youto.htm, Applications, Sep. 10, 2019, 5 pages.
https://www.youtube.com/watch?v=eFiPBu_fBe4, The Making of a Newton Wovenaire Crib Mattress—YouTube, 3 pages, Apr. 21, 2016.
International Preliminary Report on Patentability dated Sep. 19, 2024 for related PCT Appln. No. PCT/US2023/014571; 8 Pages.

* cited by examiner

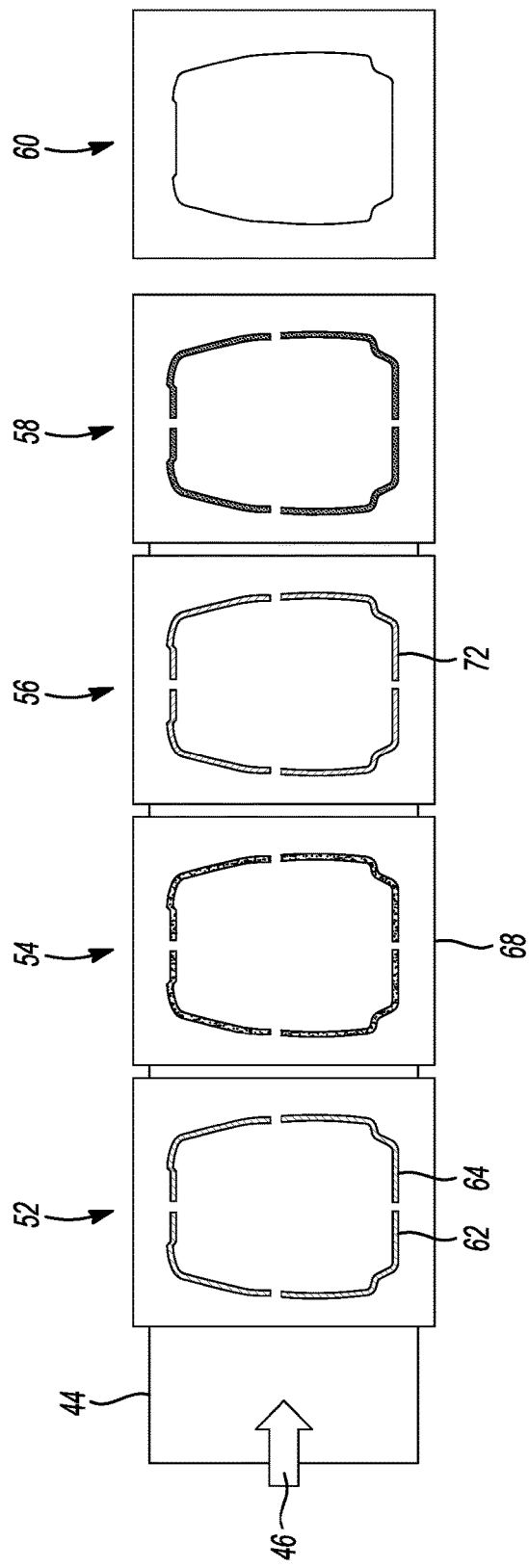
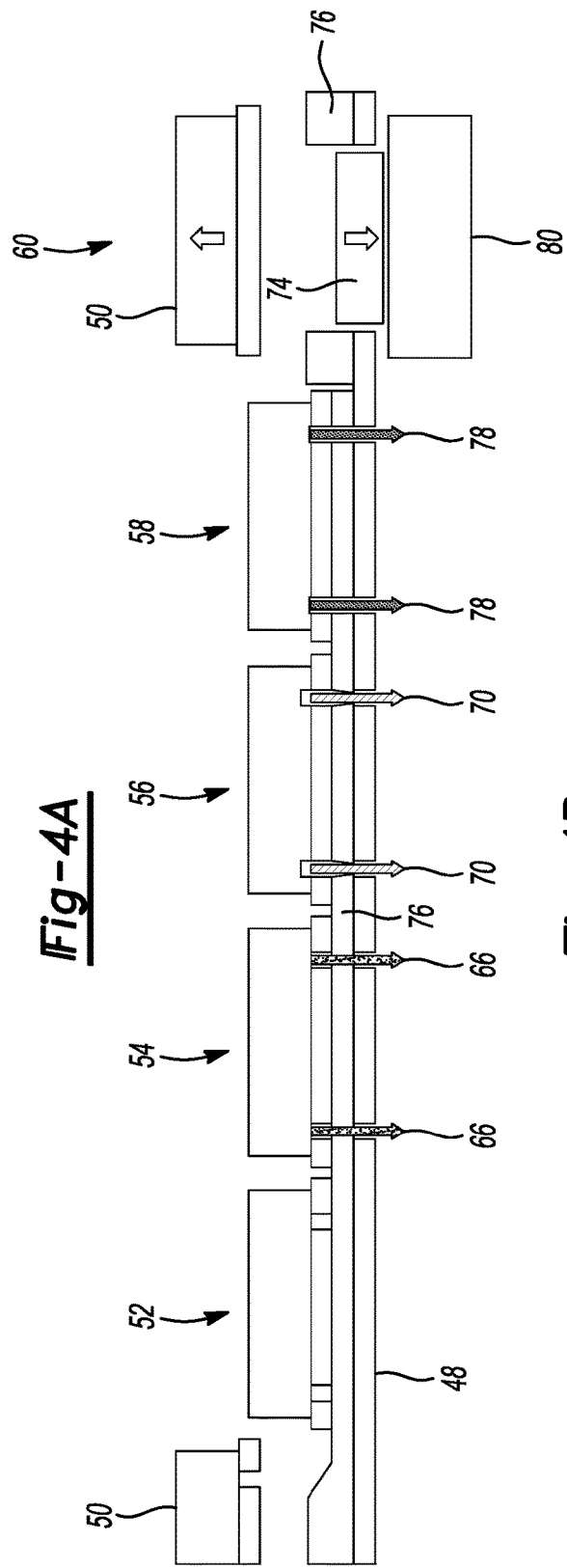

METHOD FOR PRODUCING A VEHICLE INTERIOR COMPONENT

TECHNICAL FIELD

The present disclosure relates to a method for producing a vehicle interior component.

BACKGROUND

Vehicle interior components may be relatively simple structures—e.g., an assembly of a frame, one or more cushions, and a cover material. Conversely, they can be extremely complex systems such as a seating system that includes electromechanical or pneumatic back support, occupancy sensors, seatbelt sensors, and myriad different types of sophisticated ventilation systems, just to name a few of the possible features. One component that is common to many of these interior components is a padded portion, for example, a cushion. Many of these cushions are made from a foam material, such as molded urethane. Molded polymeric foams can be configured to accommodate vehicle interior components with different properties. For example, the density of the foam may be engineered to provide a desired amount of durability, and to accommodate various ancillary systems, such as a ventilation system in a seat.

One limitation of this configuration is that the weight of the cushion may increase significantly when the density of the foam is increased. Another limitation of foam is that an molding process is often used to produce the cushion into a final or near-net shape. Mold tools for this process are expensive and require significant maintenance. These manufacturing processes have several disadvantages—e.g., complexity and cost—and the resulting cushion may add significant weight to the interior component and it may lack the desired durability. A need therefore exists for an alternative method for producing a vehicle interior component that reduces or eliminates at least some of these disadvantages.

SUMMARY

Embodiments described herein may include a method for producing a vehicle interior component that includes the steps of placing a cushion blank in a mold having a cavity with a cavity shape, where the cushion blank comprises a polymeric material in a solid state. A first fluid having a first predetermined temperature may be passed through the mold and through the cushion blank to heat the cushion blank to a compliant, non-liquid state such that the cushion blank assumes the cavity shape. A second fluid having a second predetermined temperature lower than the first predetermined temperature may be passed through the mold and through the cushion blank to cool cushion blank to a non-compliant state.

Embodiments described herein may include a method for producing a vehicle interior component that includes placing a cushion blank in a mold having a plurality of apertures and a mold cavity. The cushion blank may comprise a polymeric material in a solid state. A first fluid having a first predetermined temperature may be passed through at least some of the apertures and through the cushion blank to heat the cushion blank to a compliant, non-liquid state. A second fluid having a second predetermined temperature lower than the first predetermined temperature may be passed through the mold and through the cushion blank to cool cushion blank to a non-compliant state.

Embodiments described herein may include a method for producing a vehicle interior component that includes placing a cushion blank comprising a polymeric material in a solid state in a mold having a cavity. A first fluid flow having a first predetermined temperature may be introduced into the cushion blank a such that the cushion blank is heated to a compliant, non-liquid state in the mold. A second fluid flow having a second predetermined temperature lower than the first predetermined temperature may be introduced into the cushion blank a such that the cushion blank is cooled to a non-compliant state.

BRIEF DESCRIPTION OF THE DRAWINGS

FIGS. 4A and 4B show top and front views of a portion of a manufacturing line used with embodiments of method described herein;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
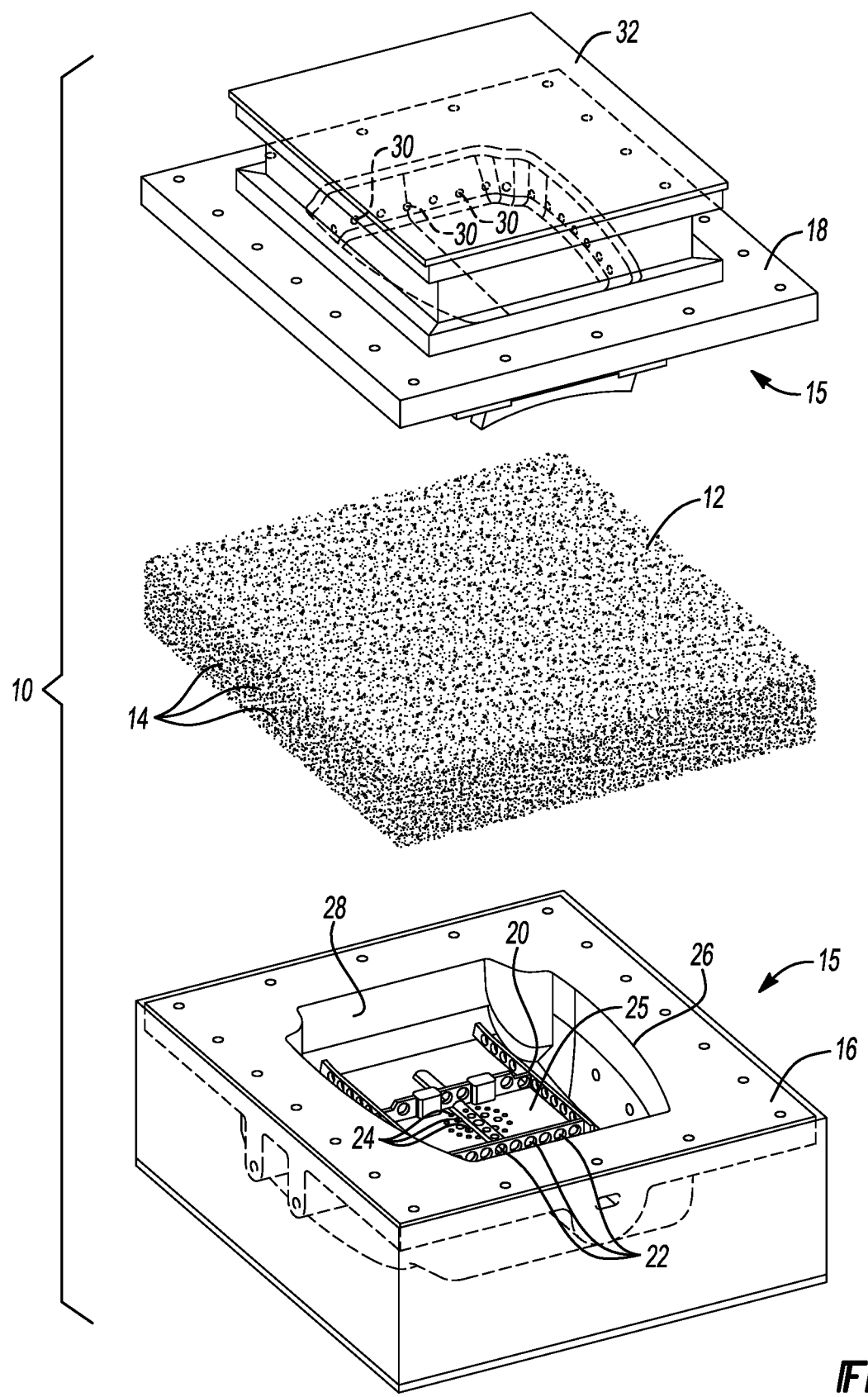
FIG. 1 shows a portion of a manufacturing process used in with embodiments of a method described herein.

FIG. 1 shows a portion of the manufacturing process 10 in accordance with embodiments of a method described herein. In this embodiment, the manufacturing process 10 performs work on a cushion blank 12, which may be used, for example, in a vehicle interior component such as a seating system. For a seating system, the cushion blank 12 may be used in a seat bottom, a seat back, bolsters, or other parts of a vehicle seating system such as arm rests. The cushion blank may also be used in other vehicle interior components such as a center console that may or may not be part of a seating system. The cushion blank 12 comprises a polymeric material, and in this embodiment, it is a stranded-mesh material made up of a plurality of integrated polymeric strands 14—for clarity, only some of the strands 14 are labeled. The strands 14 may be made from, for example, a linear low density polyethylene material, although other polymers and materials effective to provide the desired properties and functionality are contemplated. In other embodiments, a cushion blank, such as the cushion blank 12 may be made from other types of polymeric materials that may or may not be configured as a stranded-mesh material. As used herein, the terms "polymer" and "polymeric" may refer to materials commonly used and identified as polymers—e.g., polyethylene, polyurethane, etc.—or they may refer to "natural" polymers such as plant-based materials like soy foams.

As shown in FIG. 1, the cushion blank 12 is ready to be placed in a mold 15 that is made up of a bottom portion 16 and a top portion 18. The bottom portion 16 of the mold 15 includes an interior structure 20 that has a plurality of apertures 22 disposed therein—for clarity, only some of the apertures 22 are labeled in FIG. 1. The bottom portion 16 of the mold 15 also includes a plurality of apertures 24 in a bottom surface 25. As explained in more detail in conjunction with FIGS. 2 and 3, the apertures 22, 24 facilitate fluid flow through the mold 15, and through the cushion blank 12 itself. The lower portion 16 of the mold 15 includes a cavity 26 having a cavity shape 28. As explained in more detail in conjunction with FIG. 2, the mold cavity 26—and in particular the cavity shape 28—is used to shape the cushion blank 12 into a desired near-net or final shape.

Figure 2:
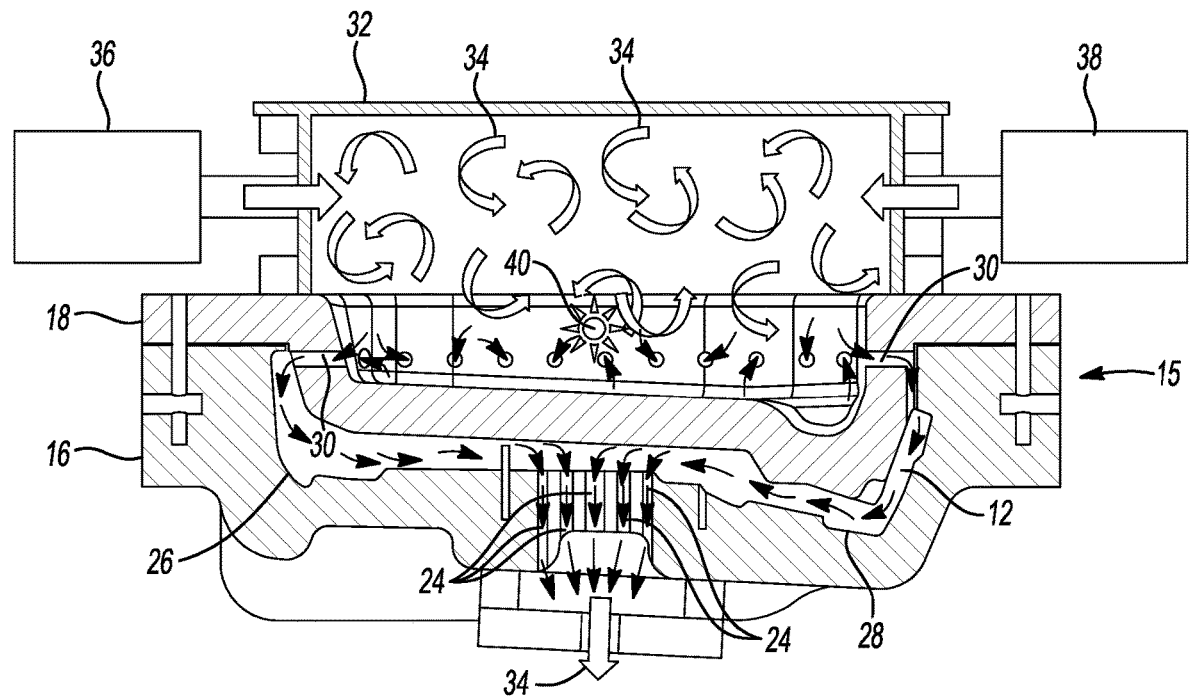
FIG. 2 shows a cross-sectional view of a material being heated in the mold in accordance with embodiments of a method described herein.

The upper portion 18 of the mold 15 also includes a plurality of apertures 30 disposed therethrough. The apertures 30 also facilitate fluid flow through the mold 15 and the cushion blank 12. Shown in FIG. 1 is a mixing chamber 32 that may be attached to the upper portion 18 of the mold 15 to facilitate mixing of the fluid flowing through the mold 15 and the cushion blank 12. This is illustrated in more detail in FIG. 2, which shows a cross-sectional view of the top and bottom portions 16, 18 of the mold 15. In FIG. 2, the cushion blank 12 is captured between the bottom and top portions 16, 18 of the mold 15, and has assumed the shape of the cavity 26.

In order to more permanently configure the shape of the blank 12 into the cavity shape 28, the cushion blank 12 is heated to a temperature where the polymeric material from which it is made begins to soften. More specifically, the cushion blank 12 is heated until it reaches a compliant, non-liquid state. That is, it is not heated to the melting point, but just until it begins to become flexible and more readily assume the cavity shape 28. The control of temperatures and other manufacturing processes may result in some limited, unintentional localized melting of the polymeric material, but if this occurs, it would be negligible, and most of the cushion blank 12 would remain in a non-liquid state. Therefore, the cushion blank 12 begins the molding process in a solid state, and mostly or completely remains in a solid-state throughout the process.

Although the cushion blank 12 could be heated by heating the bottom and top portions 16, 18 of the mold 15, this might create localized, undesirably high temperatures near the surface of the blank 12 where it contacts the mold 15, while at the same time failing to heat the cushion blank 12 adequately near its center. To address this issue, embodiments of methods described herein help to overcome this problem by heating the cushion blank 12 itself—and doing so in a way that provides a generally uniform heat application throughout the part. In the embodiment shown in FIG. 2, this is achieved by passing a first fluid having a first predetermined temperature through the bottom and top portion 16, 18 of the mold 15, and through the cushion blank 12 itself. This introduces a first fluid flow through the cushion blank 12 to bring it to a desired temperature.

The first fluid in the first fluid flow may be a gas, a liquid, or some combination of gas and liquid. For example, the first fluid may be air, steam, super-heated steam, water, etc. The first predetermined temperature will depend on the specific material from which the cushion blank 12 is manufactured. For example, for a stranded-mesh material made from linear low-density polyethylene, such as described above, the first predetermined temperature may be in the range of 85-100 C. Other types of polymeric materials may have different temperature ranges in which they become compliant—e.g., for a high-density polyethylene or a polypropylene, the first predetermined temperature may be 100-130 C.

In the embodiment shown in FIG. 2, the first fluid is heated air 34, which is schematically illustrated by the arrows inside the mixing chamber 32. This means that in this embodiment, the first fluid flow 34 is a first airflow. The air may be at ambient pressure, or it may be compressed or at other pressures different from ambient pressure. As shown in FIG. 2, the air 34 is introduced into the mixing chamber 32 from two sources 36, 38. In practice, the first fluid 34 may be introduced from a single source, or a single source having more than one outlet that leads into the mixing chamber 32. In other embodiments, a mixing chamber, such as the mixing chamber 32, may not be used and the first fluid flow 34 may be introduced directly into the top portion 18 of the mold 15.

In the embodiment shown in FIG. 2, a temperature sensor 40 is placed in the upper portion 18 of the mold 15 to monitor the temperature of the first fluid 34 as it is introduced into the mold 15 and through the cushion blank 12. The first fluid 34 flows through the apertures 30 in the upper portion 18 of the mold 15, and through the cushion blank 12, before exiting through the apertures 24 in the bottom portion 16 of the mold 15. In this embodiment, the first fluid 34 also passes through the apertures 22 in the interior structure 20 of the bottom portion 16 of the mold 15—see also FIG. 1. Because the cushion blank 12 is made from a stranded-mesh material, the heated air 34 flows generally uniformly throughout the entire thickness of the blank 12. This helps to ensure uniform heating so that all the material in the cushion blank 12 becomes compliant.

As used herein, the term "compliant" means that the material is in a state—e.g., it is at a temperature—where its shape can be permanently changed. This is in contrast to the movement the material may undergo when a vehicle occupant applies a force to an interior component that includes a cushion made from the cushion blank 12 and causes the cushion to compress. In that situation, the cushion has "memory" and will return to its original shape—or very near to its original shape—shortly after the occupant removes the force from the cushion; more specifically, the cushion made from the cushion blank 12 is in a non-compliant state. For a material, such as the stranded-mesh material described above, the cushion blank 12 becomes compliant when it is heated to a temperature that is high enough to cause the material to soften, but not so high that it reaches the melting temperature of the material. In at least some embodiments, the first fluid flow may be passed through the mold 15 and the cushion blank 12 for a predetermined period of time—i.e., "soaked"—to ensure that the cushion blank 12 is in the desired state.

Figure 3:
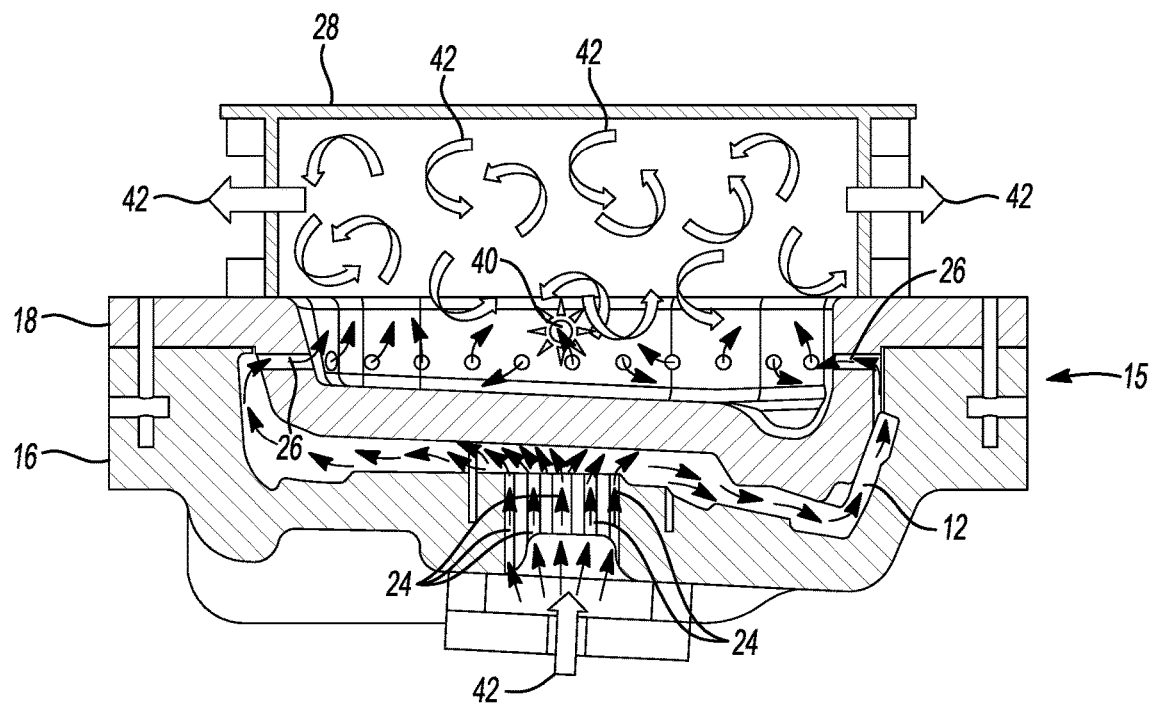
FIG. 3 shows the material from FIG. 2 being cooled in the mold.

If the cushion blank 12 was removed from the mold 15 while still in its compliant, softened state, its shape could be inadvertently changed before the material cooled and the desired shape more permanently set. To address this issue, embodiments described herein may use a cooling medium to set the shape of the blank 12—this is illustrated in FIG. 3. More specifically, a second fluid 42 may be passed through the mold 15 and the cushion blank 12, where the second fluid 42 is at a second predetermined temperature that is lower than the first predetermined temperature. Similar to the first fluid 34, the second fluid 42 may be a gas, a liquid, or some combination of the two. In this embodiment, the second fluid 42 is also air, and so the first and second fluids are the same; alternatively, the first and second fluids may be different materials or even the same material in different states. The second predetermined temperature may be chosen to be any temperature effective to put the cushion blank 12 into a non-compliant state. For example, for a linear low density polyethylene, the second predetermined temperature will be below 85 C, and for high-density polyethylene and polypropylene, it will be below 100 C.

As shown in FIG. 3, the second fluid 42 enters the bottom portion 16 of the mold 15 and flows through the apertures 24 and into the cushion blank 12. This introduces a second fluid flow through the cushion blank 12 to cool it to a desired temperature and put the blank 15 in a non-compliant state. After leaving the cushion blank 12, the second fluid 42 flows through the apertures 26 and enters the top portion 18 of the mold 15. Here the temperature sensor 40 is used to monitor the temperature of the second fluid 40. This allows the temperature of the second fluid 42 entering the bottom portion 16 of the mold 15 to be adjusted if the cooling rate is undesirably fast or slow. In the embodiment described above, the first fluid 34 is introduced into the top portion 18 of the mold 15 and the second fluid 42 is introduced into the bottom portion 16 of the mold 15. In other embodiments, this may be reversed, or the first and second fluids 34, 42 may both be introduced into the mold 15 through the top portion 18 or the bottom portion 16.

In FIGS. 1-3, the process starts with the cushion blank 12 already formed. Although FIG. 1 shows the cushion blank 12 as being generally rectangular, in practice, the cushion blank 12 may be formed to a more convenient shape to place in the mold 15. Embodiments of a method described herein contemplate preparing a cushion blank, such as the cushion blank 12, prior to its introduction into a mold. FIGS. 4A and 4B illustrate several method steps in accordance with such an embodiment. FIGS. 4A and 4B are top and front views, respectively, of a cutting process for preparing a cushion blank, such as the cushion blank 12.

In FIG. 4A, a polymeric material, and in particular a stranded-mesh material 44, is being received from an extrusion line where the material 44 is first manufactured. As shown in FIG. 4A, the stranded-mesh material 44 is moving in the direction indicated by the direction arrow 46. It moves along a conveyor 48—see FIG. 4B—after it is captured by a tool 50. The tool 50 moves with the material 44 to several stations 52, 54, 56, 58, 60. Although it is contemplated that this process will be continuous with different tools capturing the material 44 and moving with it along the conveyor 48, for convenience, the process illustrated in FIGS. 4A and 4B will be described in terms of the single tool 50 as it progresses along the conveyor 48.

At a first station 52, a portion of the material 44 is captured by the tool 50. This may be thought of as "a piece" of the polymeric material 44 being captured by the tool 50, even though at this stage of the process the material 44 is still part of a continuous sheet. As shown in FIG. 4A, the tool 50 has an open area 62 having a predetermined shape 64. In this embodiment, the predetermined shape 64 is a linear shape— i.e., it is generally comprised of rectilinear and curvilinear lines. As described in more detail below, the predetermined shape 64 defines a perimeter of the cushion blank that will be formed. In other embodiments, a tool, such as the tool 50, may have open areas with different configurations—e.g., linear, nonlinear, or some combination of the two. As the material 44 continues to along the conveyor 48, it comes to a second station 54. Here, heat is applied to the tool 50, as indicated by the arrows 66. And because of the open area 62, the heat is also applied directly to the material 44 along the lines defined by the predetermined shape 64. The remainder of the material 44 that is captured by the tool 50 is shielded from the heat by the closed areas 68 of the tool 50.

At the next station 56, the heat continues to be applied, and may be intensified as needed—this is indicated by the arrows 70. This forms a cut line 72 in the material 44 that has the predetermined shape 64, and causes separation between the portion 74 of the material 44 inside the open area 62 and the portion 76 of the material 44 outside of the open area 62—see also FIG. 5. The heat applied at stations 54, 56 may be applied at a predetermined temperature—which may be a single value, a range defined by upper and lower limits, or a range defined by a minimum temperature. The heat source may be any convenient source effective to heat the material 44 to the desired temperature—e.g., a heat source with electric or ceramic heating elements, etc. And the heat transfer may rely on conduction, convection, radiation, or some combination of these.

As described below, the portion 74 of the material 44 defines the cushion blank that will be used in a molding process, such as the molding process described above. Next, the material 44 and the tool 50 are moved to the station 58 where cooling is applied to the tool 50 as indicated by the arrows 78. Adding the cooling at station 58 stops any melting process along the cut line 72, and may set a skin that may be formed from the adjacent strands of the stranded-mesh material 44 during the heating process. Finally, the material 44 and the tool 50 moved to a station 60, which is a transfer station where the cushion blank 74 is paired with a bottom portion 80 of a mold, which may be configured the same or similarly to the bottom portion 16 of the mold 15 described above.

Figure 5:
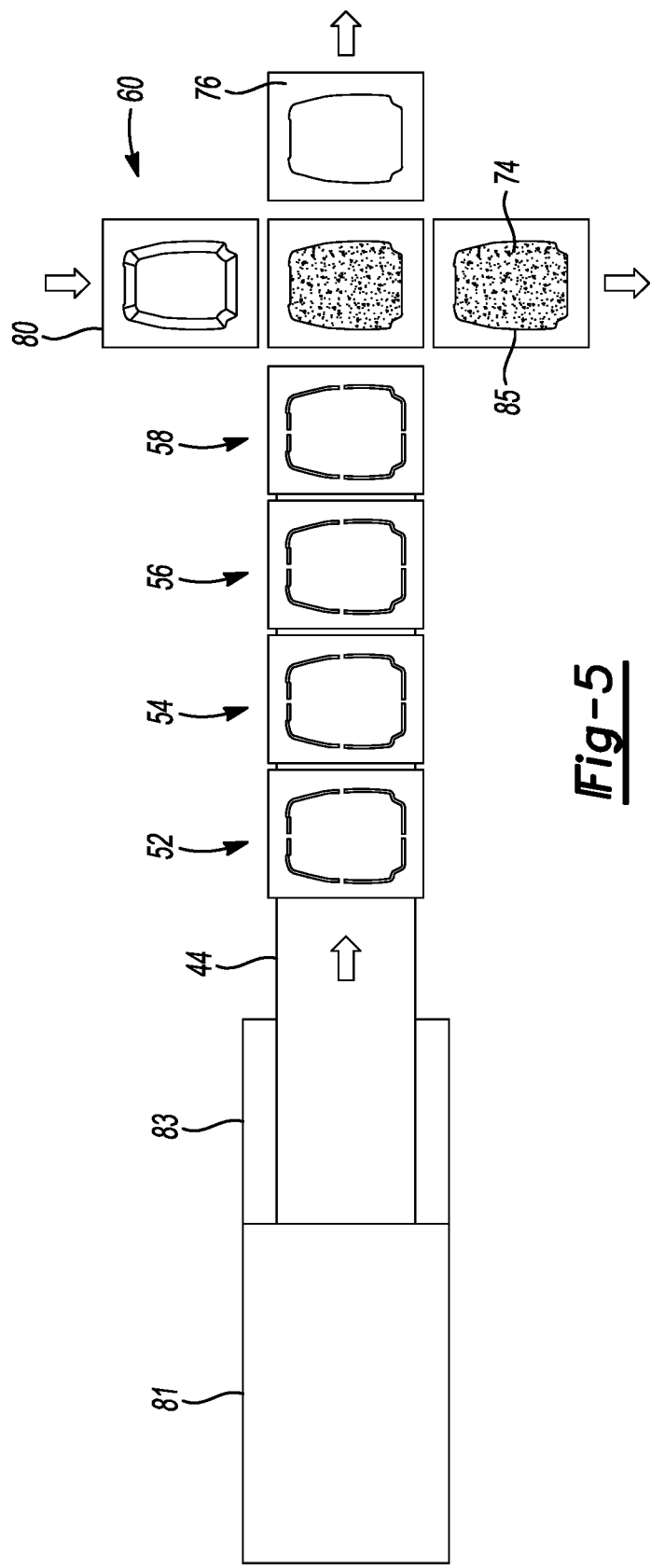
FIG. 5 shows additional detail of the manufacturing line shown in FIG. 4.

FIG. 5 shows the top view of the processes illustrated in FIG. 4A with additional detail at the beginning and end. Specifically, the material 44 may be manufactured in an extrusion process and is shown in FIG. 5 leaving an extruder 81. Because the strands of the stranded-mesh material may still be warm and the bonds between them not fully set, the material 44 may be passed through a cooling water bath 83 prior to being captured by the tool 50—see FIG. 4B—and moved along the conveyor 48. As shown in FIG. 5, the bottom portion 80 of the tool is moved under the material 44 at station 60. At the same time, the tool 50 is removed from the material 44—see FIG. 4B. The portion 74 of the material 44 that will be used for the cushion blank 74 has an outside perimeter 85 defined by the linear shape 64 of the open area 62 of the tool 50. The blank 74 is then moved away from the conveyor 48 to be molded as described above. The portion 76 of the material 44 that is not part of the cushion blank is moved to another station, where it can be reground or otherwise recycled.

Figure 6:
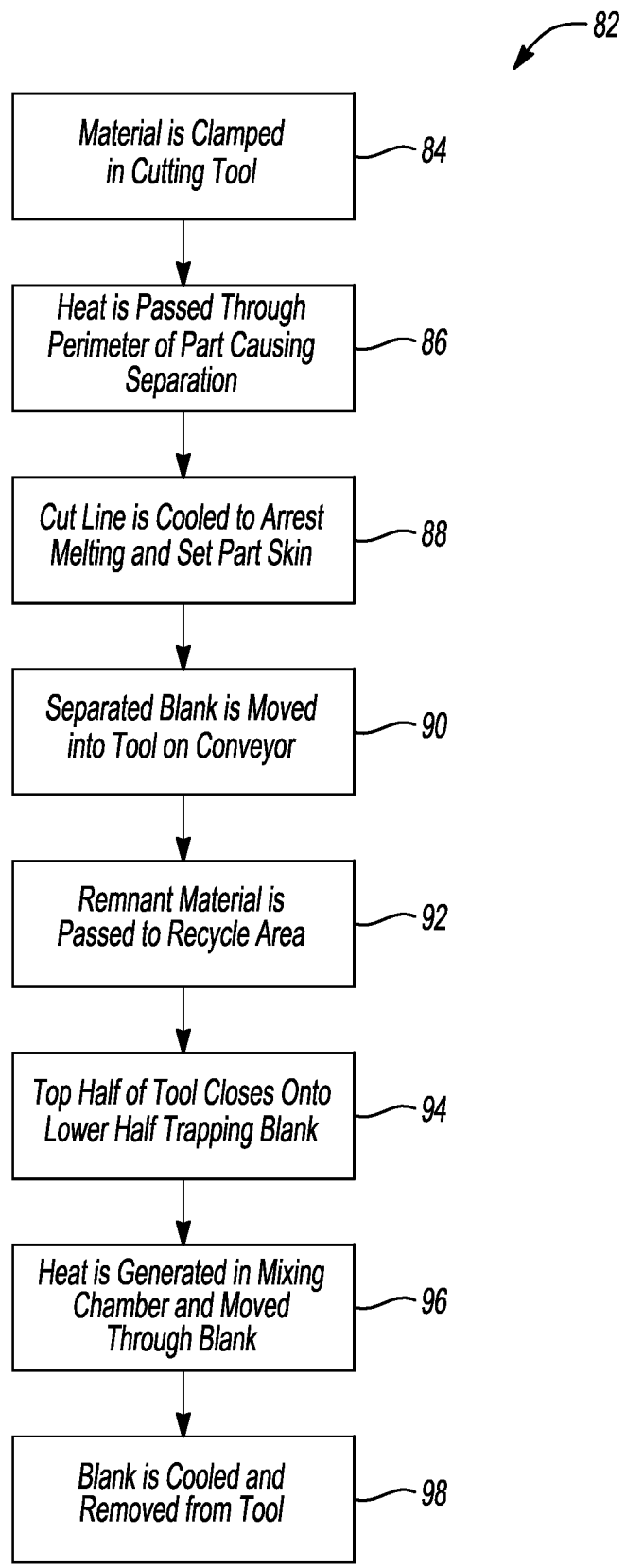
FIG. 6 shows a flowchart describing steps of an embodiment of a method described herein.

FIG. 6 shows a flowchart 82 illustrating a method in accordance with embodiments described herein. For convenience, the processes illustrated and described in conjunction with FIGS. 1-5 will be used for reference. At step 84, material is clamped in a cutting tool—see, e.g., the material 44 clamped in the cutting tool 50 shown in FIGS. 4A and 4B. At step 86, heat is passed through a portion of the tool to create a cut line and cause separation between that portion of the material that will be used for a cushion blank and the rest of the material in the tool. This is illustrated, for example, in FIGS. 4A and 4B at stations 54 and 56. Next, the cut line is cooled at step 88, which may correspond to the station 58 shown in FIGS. 4A and 4B. At steps 90 and 92, the material is separated into the cushion blank and remnant material, respectively—see station 60 in FIGS. 4A, 4B and 5. The remaining steps illustrated in the flowchart 82 are applied to the cushion blank, such as the cushion blank 12 illustrated in FIGS. 1-3. At step 94 the top portion of the tool closes onto a lower portion, which captures the cushion blank between them—see, e.g., FIG. 2, showing bottom and top portions 16, 18 of the mold 15 capturing the cushion blank 12. At step 96, heat is generated in the mixing chamber attached to the mold and it is moved through the cushion blank. This is also illustrated in FIG. 2. Finally, at step 98, the blank is cooled—see FIG. 3—and it is then removed from the tool and ready to be integrated into a vehicle interior component.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for producing a vehicle interior component, comprising:
   placing at least a portion of a polymeric material in a tool comprising an open area of a predetermined shape;
   applying heat to the polymeric material through the open area to form a cut line comprising the predetermined shape to form a cushion blank;
   placing the cushion blank in a mold comprising a cavity with a cavity shape, wherein the mold comprises a top portion comprising a first plurality of apertures and a bottom portion comprising a second plurality of apertures;
   passing a first fluid comprising a first predetermined temperature through the first plurality of apertures in the top portion of the mold and through the cushion blank to heat the cushion blank to a compliant, non-liquid state such that the cushion blank assumes the cavity shape; and
   passing a second fluid comprising a second predetermined temperature lower than the first predetermined temperature through the second plurality of apertures in the bottom portion of the mold and through the cushion blank to cool cushion blank to a non-compliant state.

2. The method of claim 1, wherein:
   the tool further comprises a closed area, and the polymeric material is accessible through the open area for applying heat, and
   a first portion of the polymeric material is separated from a second portion of the polymeric material based on heat applied to the polymeric material through the open area.

3. The method of claim 2, wherein the first portion of the polymeric material is the cushion blank, and wherein the cushion blank comprising at least the portion of the polymeric material in a solid state.

4. The method of claim 2, further comprising applying cooling to the polymeric material through the open area along the cut line.

5. The method of claim 1, wherein the first fluid and the second fluid are the same.

6. The method of claim 1, wherein the polymeric material is a stranded-mesh material.

7. The method of claim 1, wherein at least one of the first fluid or the second fluid is air.

8. A method for producing a vehicle interior component, comprising:
   placing at least a portion of a polymeric material in a tool comprising an open area of a predetermined shape;
   applying heat to the polymeric material through the open area to form a cut line comprising the predetermined shape to form a cushion blank;
   placing the cushion blank in a mold comprising a top portion and a bottom portion, wherein the top portion comprises a first plurality of apertures and the bottom portion comprises a second plurality of apertures;
   passing a first fluid having a first predetermined temperature through the first plurality of apertures in the top portion and through the cushion blank to heat the cushion blank to a compliant, non-liquid state; and
   passing a second fluid having a second predetermined temperature lower than the first predetermined temperature through the second plurality of apertures in the bottom portion of the mold and through the cushion blank to cool cushion blank to a non-compliant state.

9. The method of claim 8, further comprising passing the first fluid through the first plurality of apertures and through the cushion blank for a predetermined period of time before passing the second fluid through the mold and through the cushion blank.

10. The method of claim 8, wherein the first fluid and the second fluid are different fluids.

11. The method of claim 8, wherein at least one of the first fluid or the second fluid is a liquid.

12. The method of claim 8, further comprising:
    cooling the polymeric material through the open area along the cut line, wherein the tool further comprises a closed area and the polymeric material is accessible through the open area to one of cool or heat the polymeric material.

13. The method of claim 12, further comprising separating a first portion of the polymeric material from a second portion of the polymeric material along the cut line.

14. The method of claim 13, wherein the cushion blank comprises the first portion of the polymeric material.

15. A method for producing a vehicle interior component, comprising:
    placing at least a portion of a polymeric material in a tool comprising an opening of a linear shape;
    applying heat to the polymeric material through the opening to form a cut line comprising the linear shape to form a cushion blank;
    placing the cushion blank comprising the polymeric material in a solid state in a mold comprising a cavity, wherein the mold comprises a top portion with a first plurality of apertures and a bottom portion with a second plurality of apertures;
    introducing into the cushion blank a first fluid flow comprising a first predetermined temperature through the first plurality of apertures, such that the cushion blank is heated to a compliant, non-liquid state in the mold; and
    introducing into the cushion blank a second fluid flow comprising a second predetermined temperature lower than the first predetermined temperature through the first plurality of apertures, such that the cushion blank is cooled to a non-compliant state.

16. The method of claim 15, wherein:
    a first portion of the polymeric material inside the opening is separated from a second portion of the polymeric material outside the opening based on the applied heat.

17. The method of claim 16, wherein the cushion blank comprises the portion of the polymeric material comprising having an outside perimeter defined by the linear shape.

18. The method of claim 15, further comprising maintaining the first fluid flow for a predetermined period of time before introducing into the cushion blank the second fluid flow.

19. The method of claim 15, wherein at least one of the first fluid flow or the second fluid flow is a gas.

20. The method of claim 19, wherein at least one of the first fluid flow or the second fluid flow is an airflow.

* * * * *